(12) United States Patent
Schlaupitz et al.

(10) Patent No.: US 9,669,770 B1
(45) Date of Patent: Jun. 6, 2017

(54) ADJUSTABLE FASTENER-HOLDER ASSEMBLY

(71) Applicant: GM Global Technology Operations LLC, Detroit, MI (US)

(72) Inventors: Christopher A. Schlaupitz, White Lake, MI (US); William Lupsha, Troy, MI (US); Brian A. Swain, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/099,858

(22) Filed: Apr. 15, 2016

(51) Int. Cl.
*B60R 11/00* (2006.01)
*F16B 2/00* (2006.01)

(52) U.S. Cl.
CPC .............. *B60R 11/00* (2013.01); *F16B 2/005* (2013.01); *B60R 2011/0052* (2013.01); *B60R 2011/0071* (2013.01); *B60R 2011/0077* (2013.01)

(58) Field of Classification Search
CPC .............. B60R 11/00; B60R 2011/0052; B60R 2011/0071; B60R 2011/0077; F16B 2/005
See application file for complete search history.

(56) References Cited

U.S. PATENT DOCUMENTS

| | | | | |
|---|---|---|---|---|
| 5,203,529 | A  * | 4/1993 | Penniman | E04B 9/303 248/222.11 |
| 6,994,504 | B2 * | 2/2006 | Gordon | F16B 21/088 411/45 |
| 7,534,134 | B2 | 5/2009 | Qiu | |
| 7,762,503 | B2 * | 7/2010 | Franks | F16L 3/233 24/16 PB |
| 8,601,649 | B2 * | 12/2013 | Klein | F16B 21/084 24/289 |
| 8,763,212 | B2 * | 7/2014 | Scroggie | F16B 5/0628 24/297 |
| 2004/0016088 | A1 * | 1/2004 | Angellotti | F16B 5/065 24/297 |
| 2006/0117535 | A1 * | 6/2006 | Fraser | B60R 13/0206 24/289 |

* cited by examiner

*Primary Examiner* — Corey Skurdal

(57) ABSTRACT

A fastener-holder apparatus is provided. The fastener-holder apparatus includes a fastening member; and a holder member movably connected to the fastening member. The fastener-holder apparatus may be attachable to a vehicle.

15 Claims, 3 Drawing Sheets

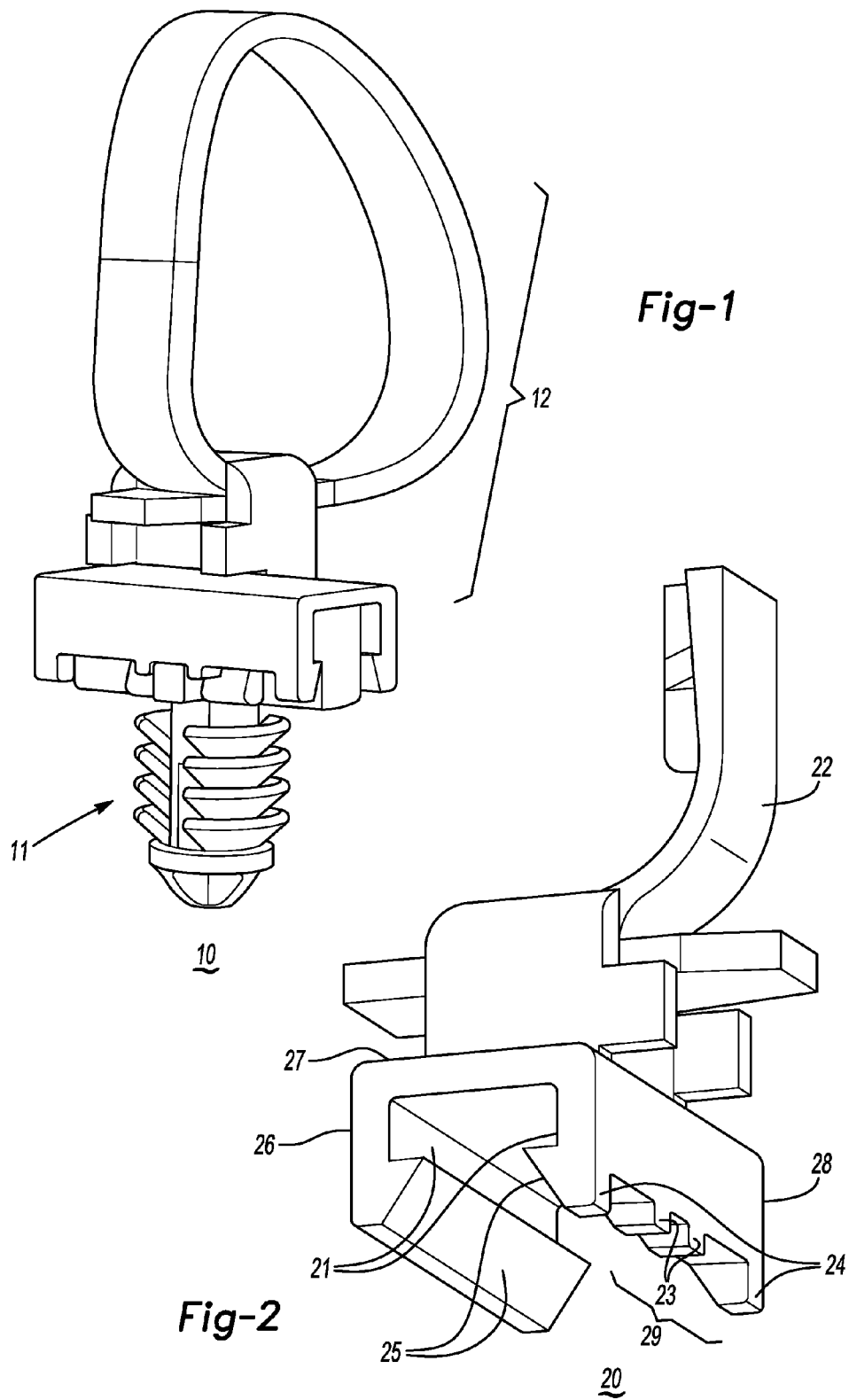

1

ADJUSTABLE FASTENER-HOLDER ASSEMBLY

INTRODUCTION

1. Field

Apparatuses consistent with exemplary embodiments relate to holder-fastener assemblies. More particularly, apparatuses consistent with exemplary embodiments relate to adjustable holder-fastener assemblies such as an adjustable tie-clip.

2. Description of Related Art

Fasteners-holder assemblies are used to attach components held or carried by a holder of the fastener-holder assembly to different types of structures or objects. Moreover, holes, mounts, etc., may be placed in the structures of objects for attaching fastener-holder assemblies. However, the narrow tolerance of a location of a hole or mount and the rigidity of components may make it difficult to place or mount a component in the fastener-holder assembly and/or attach the fastener-holder assembly to a hole or a mount. Thus, there is a need for a fastener-holder assembly to accommodate a component to be placed in the holder of the fastener-holder assembly while the fastener-holder assembly is positioned at a location of the hole or mount despite the narrow tolerance of the location of the hole or mount and the rigidity of components.

SUMMARY

One or more exemplary embodiments address the above issues by providing a fastener-holder assembly with a movable or adjustable holder member. More particularly, one or more exemplary embodiments provide a fastener-holder assembly where the holder member may be movable or adjustable along a linear path across a base of the fastening member.

According to an aspect of an exemplary embodiment, a vehicle fastener-holder apparatus is provided. The vehicle fastener-holder apparatus includes a fastening member configured to fasten to a vehicle; and a holder member movably connected to the fastening member.

According to an aspect of another exemplary embodiment, a fastener-holder apparatus is provided. The fastener-holder apparatus includes a fastening member; and a holder member movably connected to the fastening member.

The holder member may be one from among a fitting, a wire tie, a strap, a band, a clasp, and a connector.

The fastening member may be one from among a peg, a fir tree, a screw, a bolt, a hook, an anchor, and a nail.

The holder member may include a sliding member configured to slide the holder member along a linear path with respect to the fastening member.

The fastening member may include a fixing member configured to temporarily fix a position of the holder member with respect to the fastening member.

The holder member may include a limiting member configured to limit a movement of the holder member with respect to the fastening member to a predetermined range.

The fastening member may include a guiding member configured to receive the sliding member of the holder member and guide the sliding member.

The guiding member may include a rail member configured to guide the sliding member.

The sliding member may include a base, a first panel extending perpendicularly from a first side of the base, and a second panel extending perpendicularly from a second side of the base.

The first panel may include a first sliding projection extending inwardly from the first side so as to form a channel on an inner side of the first panel and the second panel may include a second sliding projection extending inwardly from the second side so as to form a second channel on an inner side of the second panel.

The second sliding projection may include two second sliding projections formed at opposite ends of the second panel, each of the second sliding projections extending inwardly from the second side.

The rail member may include a first recess formed on a first side of the guiding member and a second recess formed on a second side of the guiding member, the first recess being configured to receive the first sliding projection and the second recess being configured to receive the second sliding projection.

The sliding member may include two inner projections extending from the sliding member in a first direction, the two inner projections configured to temporarily fix the position of holder member with respect to the fastening member by engaging the fixing member.

The fixing member may include a fixing projection formed in at least one of the first recess or the second recess of the rail member, the fixing projection extending in a second direction perpendicular to the first direction.

The position of holder member may be temporarily fixed by engaging the fixing projection in between the two inner projections of the sliding member.

The limiting member may include two outer projections formed at opposite ends on at least one side of the sliding member, the two outer projections configured to limit a linear movement of the holder member with respect to the fastening member.

The two inner projections may be formed in between the two outer projections on the at least one side of the sliding member.

The linear movement may be limited to up to 5 mm in two directions along the linear path.

The holder member may be configured to move along a linear path with respect to a base of the fastening member.

The apparatus may further include a fixing member configured to temporarily fix a position of the holder member with respect to the fastening member.

The apparatus may further include a limiting member configured to limit a movement of the holder member with respect to the fastening member.

The holder member may be configured to carry at least one from among a wire, a hose, a connector, a cable, and a coil.

Other objects, advantages and novel features of the exemplary embodiments will become more apparent from the following detailed description of exemplary embodiments and the accompanying drawings.

BRIEF DESCRIPTION OF THE DRAWINGS

FIG. 1 shows an assembled view of the fastener-holder assembly according to an exemplary embodiment;

FIG. 2 shows a perspective view of a holder member of the fastener-holder assembly according to an exemplary embodiment;

DETAILED DESCRIPTION

Figure 3:
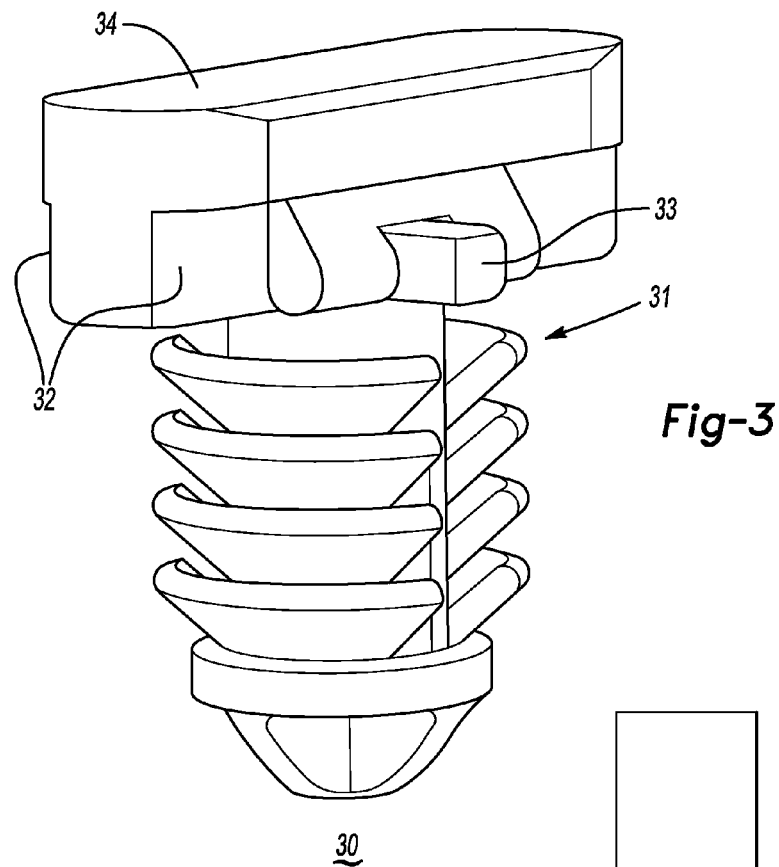
FIG. 3 shows a perspective view of a fastening member of the fastener-holder assembly according to an exemplary embodiment.

A fastener-holder assembly will now be described in detail with reference to FIGS. 1-4C of the accompanying drawings in which like reference numerals refer to like elements throughout. The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "formed on," or "disposed on" a second element, the first element may be connected directly to, formed directly on or disposed directly on the second element or there may be intervening elements between the first element and the second element unless it is stated that a first element is "directly" connected to, formed on, or disposed on the second element.

Throughout the disclosure "temporarily fixed" means that the movement of a movable element is limited, stopped or prevented at a position in such a manner that a greater application of force is required to move the element than would otherwise be required to move the element if the element is at another position that is not considered to be "temporarily fixed."

FIG. 1 shows an assembled view of a fastener-holder assembly 10 according to an exemplary embodiment. The fastener-holder assembly 10 may include a holder member 12 that is movably connected to a fastening member 11. The fastening member 11 may move along a linear path. In addition, the holder member 12 may be temporarily fixed at a center position with respect to the fastening member 11.

The fastening member 11 may be a peg, a fir tree, an anchor, a hook, an arrowhead, a snapping device, a screw, a bolt, a nail, an adhesive strip, etc. The fastening member 11 may be attachable to a mount, a recess, a hole, etc. in a structure or object such as an automobile body or automobile component.

The holder member 12 may be a wire tie type holder as shown in FIG. 1, or may be a strap, a band, a fitting, a tape, an adhesive strap, a clasp, a connector, etc. The holder member 12 may be configured to carry one or more from among a wire, a hose, a connector, a fitting, a cable, a coil, etc.

The fastener-holder assembly 10 may be formed using a mold, 3D printed, or machined using different elements. The fastener-holder assembly 10 may comprise one or more of plastic, rubber, or metal alloys.

FIG. 2 shows a perspective view of a holder member 20 of the fastener-holder 10 assembly according to an exemplary embodiment. The holder member 20 may include a sliding member with a base 27 that is connected to a tie strap 22 on a top side. The holder member 20 may include a first panel 26 that extends downward from a first long side of the base 27 and a second panel 28 that extends downward from a second long side of the base 27 opposite of the first long side. The first panel 26 and the second panel 28 may extend in a direction perpendicular to a plane of the base 27. The first panel 26 may include a first sliding projection 25 that extends inwardly from the first panel 26 toward a center of the base 27 so as to form a first channel or grove 21. The second panel 28 may include one or more second sliding projections 22 that extend inwardly from the second panel 28 toward a center of the base 27 so as to form a second channel or grove 21. The first sliding projection 25 and the one or more second sliding projections 25 may be configured to fit into a groove or recess, or may be configured to receive a rail member so as to be slidably or moveably connected to the fastening member 11 along a linear path of movement.

The second panel 28 may include a recessed area 29 at a bottom portion thereof. The recessed area 29 may be formed in between outer projections 24 that make up a limiting member. The limiting member may limit the movement of the holder member 12 with respect to the fastening member 11. The recessed area 29 may further include two inner projections 23 that are configured to temporarily fix a position of the fastening member 11 by engaging a fixing member or a fixing projection 33 of the fastening member 11 that extends in a direction perpendicular to a direction from which the two inner projections 23 extend from the recessed area 29. In addition, the recessed area 29 may include a plurality of inner projections configured to temporarily fix the position of the fastening member 11 by engaging a fixing member or a fixing projection 33 of the fastening member 11 at multiple locations in the recessed area.

Although a holder member 12 with a sliding member has been described with reference to FIG. 2, the holder member may be modified to include other types of members that allow movement with respect to a fastening member 11. For example, the holder member 12 may be modified to incorporate bearings, wheels, toothed wheels, etc., which are configured to allow the holder member 12 to move linearly with respect to a base of the fastening member 11.

FIG. 3 shows a perspective view of a fastening member 30 of the fastener-holder assembly 10 according to an exemplary embodiment. The fastening member 30 may include a base member 34 and fastener 31 such as a peg, a fir tree, a screw, a bolt, or a nail, or another type of fastener that may be mounted on the base member 34. The base member 34 may include recessed areas 32 on opposite sides of the base member so as to form a rail member that serves as a guide member of the fastening member 30. Moreover, a fixing member or fixing projection 33 may be formed in one or both of the recessed areas 32. The fixing projection 33 may extend in a direction perpendicular to a direction of movement of the holder member 12 to temporarily fix the holder member 12 at a center position by engaging two inner projections 23 of the holder member 12. The fixing projection 33 may also limit the movement of the holder member 12 in a first direction by engaging one of the outer projections 24 and limit the movement of the holder member 12 in a second direction by engaging another one of the outer projections 24.

Figure 4A:
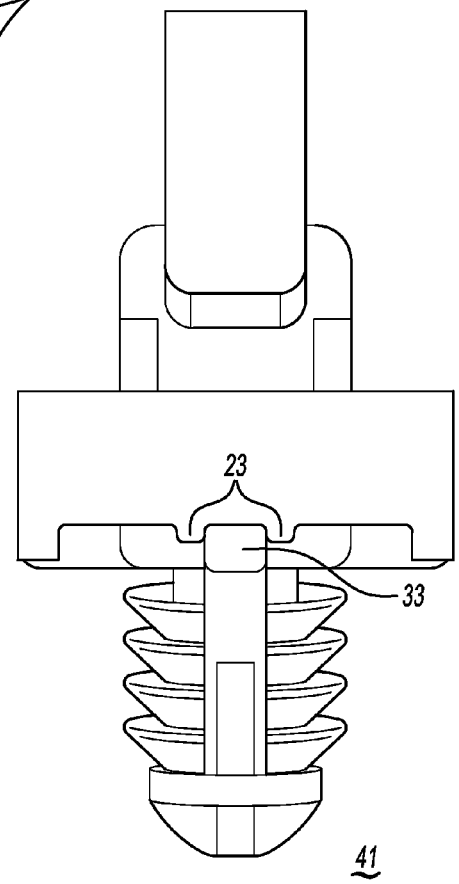
FIG. 4A shows a perspective view of the fastener-holder assembly where the holder member is in a temporarily fixed center position, according to an aspect of an exemplary embodiment.

FIG. 4A shows a perspective view of a fastener-holder assembly 41 where the holder member 12 is in a temporarily fixed center position, according to an aspect of an exemplary embodiment. As shown in FIG. 4A, two inner projections 23 of the holder 12 engage the fixing projection 33 so that the fixing projection 33 is temporarily stopped or fixed in between the inner projections 23, which fixes the holder member 12 such that a greater force is required to move the holder member 12 than would otherwise be required to move the holder member 12 when the sliding member is at another position along the guide member of the fastening member 11.

Figure 4B:
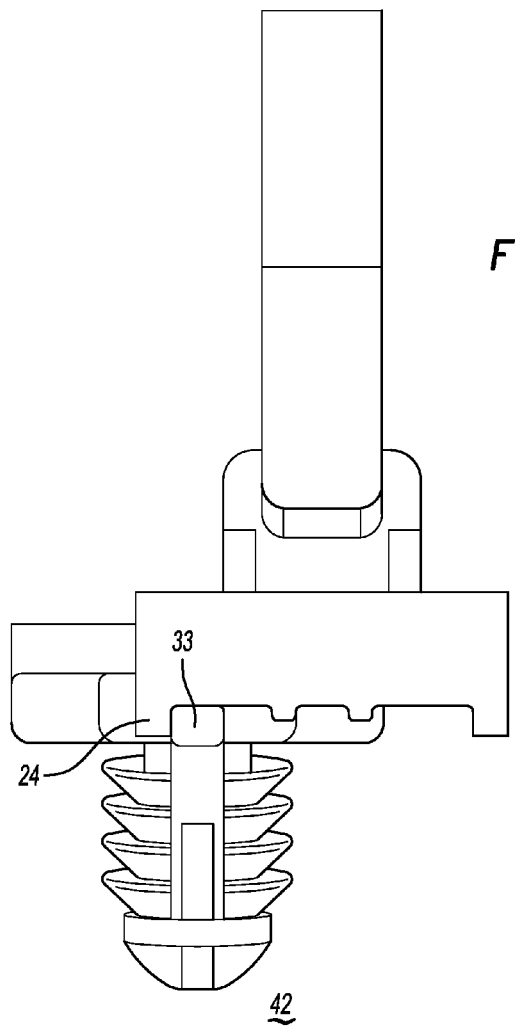
FIG. 4B shows a perspective view of the fastener-holder assembly where the holder member is at a first end position, according to an aspect of an exemplary embodiment.

FIG. 4B shows a perspective view of a fastener-holder assembly 42 where the holder member 12 is at a first end position, according to an aspect of an exemplary embodiment. As shown in FIG. 4B, one of the outer projections 24 is engaged by fixing projection 33 such that the holder member 12 is stopped from continued movement across the guide member in a first direction and thus reaches a first end position. The location of outer projection 24 may be moved closer to the center of the sliding member thereby limiting the tolerance of the movement of the holder member 12.

Figure 4C:
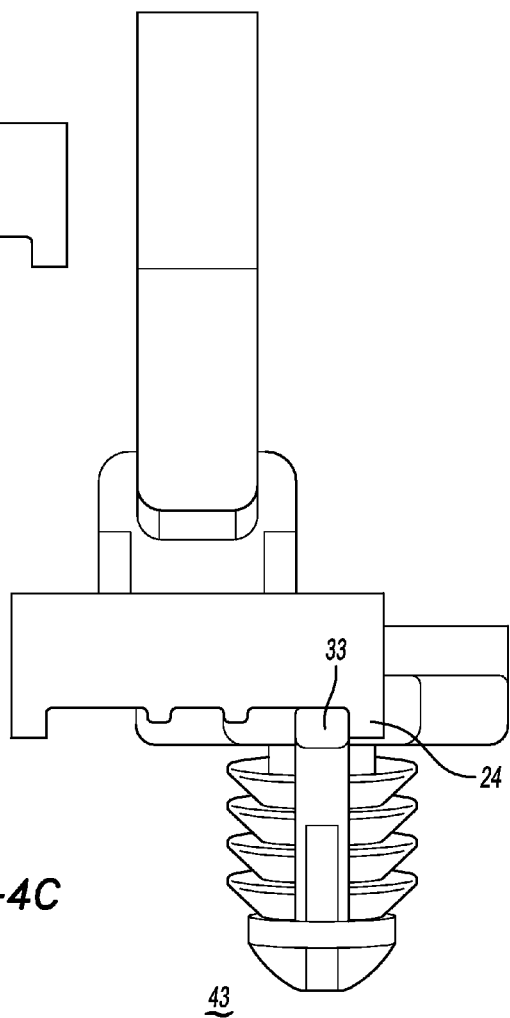
FIG. 4C shows a perspective view of the fastener-holder assembly where the holder member is at a second end position, according to an aspect of an exemplary embodiment.

FIG. 4C shows a perspective view of a fastener-holder assembly 43 where the holder member 12 is at a second end position, according to an aspect of an exemplary embodiment. As shown in FIG. 4C, another one of the outer projections 24 is engaged by fixing projection 33 such that the holder member 12 is stopped from continued movement across the guide member in a second direction and thus reaches a second end position. Alternatively, the location of the outer projections 24 may be moved closer to the center of the sliding member thereby limiting the tolerance of the movement of the holder member 12.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A fastener-holder apparatus comprising:
a fastening member; and
a holder member movably connected to the fastening member, the holder member comprising a sliding member configured to slide the holder member along a linear path with respect to the fastening member,
wherein the holder member comprises a limiting member comprising two outer projections formed at opposite ends on at least one side of the sliding member, the two outer projections configured to limit a linear movement of the holder member with respect to the fastening,
wherein the sliding member comprises two inner projections extending from the sliding member in a first direction, the two inner projections configured to temporarily fix the position of holder member with respect to the fastening member by engaging a fixing member, and
wherein the two inner projections are positioned between the two outer projections.

2. The apparatus of claim 1, wherein the holder member is one from among a fitting, a wire tie, a strap, a band, a tape, an adhesive strap, a clasp, and a connector.

3. The apparatus of claim 1, wherein the fastening member is one from among a peg, a fir tree, an arrowhead, a snapping device, a screw, a bolt, a hook, an anchor, an adhesive strip and a nail.

4. The apparatus of claim 1, wherein the fastening member comprises a guiding member configured to receive the sliding member of the holder member and guide the sliding member.

5. The apparatus of claim 4, wherein the guiding member comprises a rail member configured to guide the sliding member.

6. The apparatus of claim 5, wherein the sliding member comprises a base, a first panel extending perpendicularly from a first side of the base, and a second panel extending perpendicularly from a second side of the base, and
wherein the first panel comprises a first sliding projection extending inwardly from the first side so as to form a channel on an inner side of the first panel and the second panel comprises a second sliding projection extending inwardly from the second side so as to form a second channel on an inner side of the second panel.

7. The apparatus of claim 6, wherein the second sliding projection comprises two second sliding projections formed at opposite ends of the second panel, each of the second sliding projections extending inwardly from the second side.

8. The apparatus of claim 7, wherein the rail member comprises a first recess formed on a first side of the guiding member and a second recess formed on a second side of the guiding member, the first recess being configured to receive the first sliding projection and the second recess being configured to receive the second sliding projection.

9. The apparatus of claim 8, wherein the fixing member comprises a fixing projection formed in at least one of the first recess or the second recess of the rail member, the fixing projection extending in a second direction perpendicular to the first direction, and
wherein the position of holder member is temporarily fixed by engaging the fixing projection in between the two inner projections of the sliding member.

10. The apparatus of claim 9, wherein the linear movement is limited to up to 5 mm in two directions along the linear path.

11. A fastener-holder apparatus comprising:
a fastening member; and
a holder member movably connected to the fastening member,
wherein the holder member comprises a sliding member configured to slide the holder member along a linear path with respect to the fastening member, a limiting member configured to limit a linear movement of the holder member with respect to the fastening member to a predetermined range,
wherein the fastening member comprises a fixing member configured to temporarily fix a position of the holder member with respect to the fastening member, a guiding member comprising a rail member configured to receive the sliding member of the holder member and guide the sliding member,
wherein the sliding member comprises a base, a first panel extending perpendicularly from a first side of the base, and a second panel extending perpendicularly from a second side of the base,
wherein the first panel comprises a first sliding projection extending inwardly from the first side so as to form a channel on an inner side of the first panel and the second panel comprises two second sliding projections formed at opposite ends of the second panel, each of the two second sliding projections extending inwardly from the second side so as to form a second channel on an inner side of the second panel, wherein the rail member comprises a first recess formed on a first side of the guiding member and a second recess formed on a second side of the guiding member, the first recess being configured to receive the first sliding projection and the second recess being configured to receive the second sliding projection, and wherein the sliding member comprises two inner projections extending from the sliding member in a first direction, the two inner projections configured to temporarily fix the position of holder member with respect to the fastening member by engaging the fixing member.

12. The apparatus of claim 11, wherein the fixing member comprises a fixing projection formed in at least one of the first recess or the second recess of the rail member, the fixing projection extending in a second direction perpendicular to the first direction, and wherein the position of holder member is temporarily fixed by engaging the fixing projection in between the two inner projections of the sliding member.

13. The apparatus of claim 11, wherein the linear movement is limited to up to 5 mm in two directions along the linear path.

14. The apparatus of claim 11, wherein the holder member is one from among a fitting, a wire tie, a strap, a band, a tape, an adhesive strap, a clasp, and a connector.

15. The apparatus of claim 11, wherein the fastening member is one from among a peg, a fir tree, an arrowhead, a snapping device, a screw, a bolt, a hook, an anchor, an adhesive strip and a nail.

* * * * *